United States Patent [19]

Maurer et al.

[11] Patent Number: 5,094,807
[45] Date of Patent: Mar. 10, 1992

[54] SINGLE SOLVENT PROCESS FOR PREPARATION OF GLUTARIMIDE CONTAINING POLYMERS

[75] Inventors: Brian R. Maurer; Clark J. Cummings, both of Midland; Karen Mueller, Bay City, all of Mich.

[73] Assignee: The Dow Chemical Company, Midland, Mich.

[21] Appl. No.: 580,023

[22] Filed: Sep. 10, 1990

[51] Int. Cl.⁵ .............................................. C08F 8/32
[52] U.S. Cl. .............................. 525/378; 525/329.9; 525/330.5; 525/379
[58] Field of Search ................................ 525/378, 379

[56] References Cited

U.S. PATENT DOCUMENTS 4,954,575  9/1990  Sasaki et al. ..................... 525/330.5

Primary Examiner—Bernard Lipman

[57] ABSTRACT

A process for preparing glutarimide resins by the amidization and cycloimidization of methacrylate resins in the presence of a solvent characterized in that the solvent consists essentially of cyclohexanol.

3 Claims, No Drawings

SINGLE SOLVENT PROCESS FOR PREPARATION OF GLUTARIMIDE CONTAINING POLYMERS

The present invention relates to a process for preparing a resin containing glutarimide units. More particularly the present invention relates to a process for preparing such polymers which employs a single solvent In U.S. Pat. No. 4,745,159 there is disclosed a process for preparing glutarimide containing polymers (referred to as methacrylimide units) which employs a solvent mixture in a process for the amidization and cycloimidization of methacrylate based polymers. Suitable solvent systems were said to include mixtures of two or more components selected from aliphatic alcohols, aromatic hydrocarbons and ketone or ether compounds. Such a solvent system was found necessary to maintain the solubility of the various reactants and products during the process and to insure that the resulting polymer's properties, especially transparence was not adversely affected.

Although the process disclosed in the foregoing U.S. patent does succeed in producing glutarimide containing polymers having good physical properties, the requirement of a multicomponent solvent system introduces complexity and expense into the procedure. Separate storage and supply facilities and more complex purification and recovery systems are required in a process employing a multicomponent solvent system compared to a process employing only one solvent. Thus, it would be desirable if there could be provided a single solvent which is suitable for use in the amidization and cycloimidization of methacrylate resins without sacrifice of resulting physical properties of the glutarimide polymer.

According to the present invention there is provided a process for preparing glutarimide resins by the amidization and cycloimidization of methyl methacrylate or methacrylic acid resins in the presence of a solvent characterized in that the solvent consists essentially of cyclohexanol.

The present invention provides a composition comprising glutarimide units of the following formula:

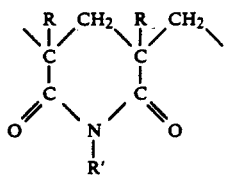

wherein R each occurrence is hydrogen or methyl and R' is a hydrogen atom or an aliphatic, alicyclic or aromatic hydrocarbon group having from 1 to 20 carbon atoms.

Further, the present invention provides a process for preparing a glutarimide resin which comprises reacting a resin comprising methyl methacrylate or methacrylic acid units, with an amine of the formula $R'NH_2$ wherein R' is as defined above, under conditions such that said resin is dissolved in cyclohexanol under amidization and cycloimidization conditions.

Suitable methyl methacrylate or methacrylic acid resins (referred to hereafter as methacrylate resins) to be employed in the present invention include methyl methacrylate, or methacrylic acid homopolymers as well as copolymers of methyl methacrylate or methacrylic acid with other copolymerizable monomers such as acrylic esters, $C_2$–$C_{12}$ alkyl, cycloalkyl or aryl esters of methacrylic acid, acrylic acid, $C_1$–$C_{12}$ alkyl or aryl esters of acrylic acid, styrene, α-methyl styrene, etc. Such polymers usually have an intrinsic viscosity of from 0.01 to 3.0 dl/g (at 25° C. in dimethyl formamide). Other copolymerizable monomers are used in an amount of preferably not higher than 90 percent by weight based on the monomer mixture. The acrylic esters preferably include methyl acrylate, ethyl acrylate, butyl acrylate, cyclohexyl acrylate, 2-ethylhexyl acrylate and benzyl acrylate, and the $C_1$–$C_{12}$ alkyl esters of methacrylic acid include ethyl methacrylate, butyl methacrylate, cyclohexyl methacrylate and benzyl methacrylate. These monomers may be used alone or in a combination of two or more different kinds. Preferred polymers contain less than 1,000 ppm, more preferably less than 500 ppm of methyl methacrylate dimer.

Highly preferred methacrylate polymers are polymethyl methacrylate and copolymers of styrene and/or $C_{2-12}$ alkylesters or $C_{6-12}$ cycloalkylesters of methacrylic acid and methyl methacrylate containing from 25 to 90 weight percent methyl methacrylate.

The production of the glutarimide resin composition of the present invention may be divided into two steps, the amidization step and the cycloimidization step, as mentioned above. The two steps of the process may be conducted individually if desired but are preferably conducted sequentially in a single, unified process. In the amidization step the methacrylate resin and the amine of the formula $R'NH_2$ are reacted under the specific condition to induce a condensation reaction among the polymer side chains of the methacrylate resin. Preferably the amine of the formula $R'NH_2$ is dissolved into a solution of the methacrylate resin in cyclohexanol solvent and reacted with the resin. The quantity of amine reactant employed depends on the degree of cycloimidization desired in the resulting polymer. At a minimum, one mole of amine should be employed for each mole of cyclic imide functionality desired in the resulting polymer. Preferably a slight excess of amine is employed where maximum cycloimidization of methyl methacrylate functionality is desired. In the case where a copolymer of a higher alkyl methacrylate and methyl methacrylate is desired, it has been found that only the methyl methacrylate units are affected by the amidization process, but that $C_2$–$C_{12}$ alkyl, cycloalkyl or aryl esters of methacrylic acid adjacent to methacrylamide moieties (resulting from the amidization of methyl methacrylate or methacrylic acid) undergo cycloimidization.

Suitable reaction conditions for the amidization and cycloimidization process are temperatures from 100° to 300° C., preferably from 50° to 275° C., most preferably from 80° to 250° C. Elevated pressures are preferably employed depending on the temperature utilized. Suitably pressures from 1 to 15 MPa, preferably from 3 to 10 MPa, most preferably from 5 to 8 MPa are employed. Suitable reaction times are from several minutes to many hours particularly from: 1 hour to 20 hours, more preferably from 3 hours to 10 hours, most preferably from 5 hours to 12 hours. The quantity of amine reactant expressed as a mole ratio based on moles of methyl methacrylate present in the polymer is desirably from 0.1:1 to 2.0:1, preferably from 0.3:1 to 1:1.

A sufficient quantity of cyclohexanol solvent is employed in the aforementioned amidization process to provide a polymer concentration in the range from 10 to 70 percent by weight, preferably from 15 to 40 percent by weight. Preferred amines represented by the formula R'NH$_2$ used in the process of the present invention are those wherein R' is an aliphatic hydrocarbon group, especially methylamine, ethylamine and propylamine. It is also possible to generate the foregoing amine reactant in situ by the use of compounds capable of producing such amines under heating, such as urea, 1,3-dimethylurea, 1,3-diethylurea and 1,3-dipropylurea.

As amines wherein R' is an aromatic hydrocarbon group, aniline, toluidine and trichloroaniline may be mentioned. As an amine wherein R' is an alicyclic hydrocarbon group, cyclohexyl amine may be mentioned.

Any reactor may be employed for the amidization or cycloimidization so long as the object of the present invention can be accomplished without hindrance. However, it is preferred to employ a plug flow type reactor provided with an inlet, an outlet and static mixing devices adapted to provide a mixing function throughout the interior of the reactor. The product may be isolated by devolatilization, precipitation or similar technique. Preferably the product is recovered by the use of a vented extruder that allows removal of cyclohexanol solvent and direct pelletizing of the product resin.

In the process of the present invention, it may be preferred to add a small amount of an antioxidant to prevent a decrease of the molecular weight due to the radical depolymerization of the methacrylate resin starting material under a high temperature reaction condition. Suitable antioxidants include phosphite type antioxidants such as tricresyl phosphite, cresylphenyl phosphite, trioctyl phosphite or tributoxyethyl phosphite, hindered phenol type antioxidants such as hydroquinone, 2,6-ditertiarybutylphenol, 2,6-ditertiarybutyl-4-methylphenol, etc.

The surprising feature of the present invention is that one solvent can be employed which is capable of dissolving the methacrylate resin starting material and retaining the resulting reaction products of both the amidization and cycloimidization in solution. Previous artisans had disclosed that one solvent cannot be employed in order to obtain both complete amidization and imidization as is desired. The resulting product where such defects occur contains a high yellowness index.

Additives such as plasticizers, lubricants, ultraviolet absorber, coloring agents and pigments, may be incorporated into the resulting glutarimide product if desired. The resin may be used as a molding resin in the preparation of molded articles for automotive, instrument and appliance manufacture.

Having described the invention the following examples are provided as further illustrative and are not to be construed as limiting. Unless stated to the contrary parts and percentages are based on weight.

EXAMPLES 1 AND 2

Partial polymer solutions (30 percent) were prepared for a series of copolymer samples containing differing levels of styrene (STY) and methylmethacrylate (MMA). Reagent grade cyclohexanol and for the comparative polymers a solvent mixture of toluene/methanol (90/10) were used to dissolve the various polymer samples. In the case of the cyclohexanol solvent, the cyclohexanol and polymer were initially heated at approximately 50° C. to dissolve the polymer. Once the samples were dissolved, approximately 150 grams of solution was transferred to a 300 ml pressure reactor. The reactor contents were thoroughly flushed with nitrogen, evacuated to approximately 10 mm Hg, and loaded with methylamine to give a 1:1 ratio based on MMA content. The reactor was then heated to a reaction temperature of 230° C. The reactor pressure typically ranged from 2 to 4 MPa depending on the solvent system, quantity of amine, etc. The reaction was allowed to proceed for a total of ten hours. Once the reactor pressure had subsided, the contents were drained into an aluminum foil pan and thoroughly devolatilized for approximately 1-2 hours at 220° C./4 Torr. The polymer samples were then compression molded for polymer evaluation. The results of this study are shown in Table I.

In Table I the physical properties of the initial methacrylate polymers prior to amination and cycloimidization, the comparative polymers (comparative) and polymers according to the invention are reported. Molecular weights (Mw) were measured by gel permeation chromatography (GPC) utilizing a polystyrene standard.

TABLE I

| Example | Composition (mole %) | | | | Tg (°C.) | Mw × 10$^3$ | Mw/Mn | Flex Stress | | Flex Modulus | | MFR* (I) |
| --- | --- | --- | --- | --- | --- | --- | --- | --- | --- | --- | --- | --- |
| | S | MMA | meMAM | meGI | | | | psi | (MPa) | psi | (MPa) | |
| Initial | 34 | 66 | — | — | 108 | 96 | 1.9 | 12,100 | (83) | 437,000 | (3000) | 15.9 |
| Comparative | 46 | — | 13 | 41 | 153 | 94 | 2.1 | 13,300 | (92) | 552,000 | (3800) | 0.9 |
| 1 | 46 | — | 13 | 41 | 159 | 86 | 1.9 | 9,600 | (66) | 544,000 | (3800) | 1.0 |
| Initial | 63 | 37 | — | — | 105 | 130 | 2.0 | 10,700 | (74) | 432,000 | (2900) | 29.7 |
| Comparative | 69 | — | 15 | 16 | 141 | 111 | 2.2 | 11,200 | (77) | 500,000 | (3500) | 3.7 |
| 2 | 69 | — | 15 | 16 | 145 | 113 | 2.3 | 11,000 | (75) | 522,000 | (3600) | 3.9 |

S = styrene
MMA = methyl methacrylate
meMAM = N-methyl methacrylamide
meGI = N-methyl dimethylglutarimide
*MFR (I) = melt flow rate g/10 min. Condition I-ASTM D 1238

What is claimed is:

1. A process for preparing glutarimide resins by the amidization and cycloimidization of methacrylate resins in the presence of a solvent characterized in that the solvent consists essentially of cyclohexanol.

2. The process of claim 1 wherein the methacrylate polymer is polymethyl methacrylate or a copolymer comprising methyl methacrylate and one or more monomers selected from styrene and C$_2$-C$_{12}$ alkyl esters or C$_6$-C$_{12}$ cycloalkyl esters of methacrylic acid containing from 10 to 90 weight percent methyl methacrylate.

3. The process of claim 1 wherein the amidization and cycloimidization is conducted by contacting the methacrylate ester with an amine of the formula R'NH$_2$ wherein R' is hydrogen or an aliphatic, alicyclic, or aromatic hydrocarbon group having from 1 to 20 carbon atoms at a temperature from 100° to 300° C. and a pressure from 1 to 15 MPa for from 1 to 20 hours.

* * * * *